(12) United States Patent
Perkins (10) Patent No.: US 12,338,941 B2
(45) Date of Patent: Jun. 24, 2025

(54) MOLDING SYSTEM FOR INSULATED PIPE

(71) Applicant: Bayou Holdco, Inc., Houston, TX (US)

(72) Inventor: Randall Perkins, Houston, TX (US)

(73) Assignee: Bayou HoldCo, Inc., Houston, TX (US)

( * ) Notice: Subject to any disclaimer, the term of this patent is extended or adjusted under 35 U.S.C. 154(b) by 371 days.

(21) Appl. No.: 17/457,476

(22) Filed: Dec. 3, 2021

(65) Prior Publication Data

US 2022/0178491 A1   Jun. 9, 2022

Related U.S. Application Data (60) Provisional application No. 63/121,596, filed on Dec. 4, 2020.

(51) Int. Cl.
| | |
|---|---|
| *F16L 59/02* | (2006.01) |
| *B29C 45/14* | (2006.01) |
| *B29C 45/16* | (2006.01) |
| *B29L 23/00* | (2006.01) |

(52) U.S. Cl.
CPC ...... *F16L 59/029* (2013.01); *B29C 45/14622* (2013.01); *B29C 45/1671* (2013.01); *B29L 2023/225* (2013.01)

(58) Field of Classification Search
CPC ............. F16L 59/029; B29C 45/14622; B29C 45/1671; B29L 2023/225
See application file for complete search history.

(56) References Cited

U.S. PATENT DOCUMENTS

| | | | | |
|---|---|---|---|---|
| 2,053,307 A | | 9/1936 | Wilson | |
| 2,119,415 A | | 5/1938 | Bodge | |
| 3,053,715 A | * | 9/1962 | Labino | C04B 30/02 |
| | | | | 138/146 |
| 3,346,016 A | * | 10/1967 | Blau | F16L 59/029 |
| | | | | 220/62.16 |
| 3,359,351 A | * | 12/1967 | Bender | F16L 59/22 |
| | | | | 264/45.5 |
| 3,715,265 A | * | 2/1973 | Allen | B32B 15/16 |
| | | | | 428/920 |
| 3,718,309 A | | 2/1973 | Harris | |

(Continued)

FOREIGN PATENT DOCUMENTS

| | | |
|---|---|---|
| CN | 202878583 U | 4/2013 |
| CN | 107803926 A | 3/2018 |

(Continued)

*Primary Examiner* — David R Deal
(74) *Attorney, Agent, or Firm* — Stinson LLP (57) ABSTRACT

A pipe has first and second exterior layers of insulation. The first layer of insulation has a higher temperature rating than the second. The second layer can be thicker than the first. In a system and method for forming the insulated pipe, a first mold having a first inner diameter is used for the first layer of insulation and a second mold having a second inner diameter greater than the first inner diameter is used for the second layer of insulation. The first layer of insulation is formed from a first polymer and the second is formed over the first layer from a second polymer. Multiple insulated pipes can be joined together at field joints and field joint insulation can be formed from first and second layers of field joint insulation corresponding in material and thickness to the first and second layers of pipe insulation.

11 Claims, 5 Drawing Sheets

(56) References Cited

U.S. PATENT DOCUMENTS

| | | | |
|---|---|---|---|
| 3,768,523 A * | 10/1973 | Schroeder | F16L 59/147 |
| | | | 138/149 |
| 3,876,355 A | 4/1975 | Baughmann | |
| 3,889,919 A | 6/1975 | Ladney, Jr. | |
| 3,929,166 A | 12/1975 | Westerheid | |
| 3,948,292 A | 4/1976 | Goto et al. | |
| 4,522,578 A | 6/1985 | Martin, Jr. et al. | |
| 4,909,972 A | 3/1990 | Britz | |
| 5,298,299 A * | 3/1994 | Shea | F16L 58/1009 |
| | | | 138/DIG. 6 |
| 5,356,580 A | 10/1994 | Clark et al. | |
| 5,491,880 A | 2/1996 | Labiche | |
| 5,662,841 A | 9/1997 | Guergov | |
| 5,817,347 A | 10/1998 | Tamcsin et al. | |
| 5,896,895 A * | 4/1999 | Simpkin | F28F 13/00 |
| | | | 138/143 |
| 6,058,979 A | 5/2000 | Watkins | |
| 6,199,593 B1 | 3/2001 | Schmiade | |
| 6,827,710 B1 | 12/2004 | Mooney et al. | |
| 7,195,730 B2 | 3/2007 | Calderoni et al. | |
| 8,950,071 B2 | 2/2015 | Knecht | |
| 10,357,907 B2 | 7/2019 | Perkins | |
| 2006/0032588 A1 | 2/2006 | Appleby et al. | |
| 2007/0182071 A1 | 8/2007 | Sekido et al. | |
| 2013/0170913 A1 | 7/2013 | Hoffmann | |
| 2013/0185923 A1 | 7/2013 | Jensen | |
| 2015/0044320 A1 | 2/2015 | George et al. | |
| 2016/0243736 A1 | 8/2016 | Stier | |
| 2017/0355114 A1 | 12/2017 | Perkins | |
| 2018/0043584 A1 | 2/2018 | Feng et al. | |

FOREIGN PATENT DOCUMENTS

| | | |
|---|---|---|
| CN | 108656339 A | 10/2018 |
| CN | 209395135 U | 9/2019 |
| CN | 209395136 U | 9/2019 |
| DE | 10314032 A1 | 10/2004 |
| DE | 102011009333 A1 | 7/2012 |
| EP | 2305443 A1 | 4/2011 |
| GB | 1220349 A | 1/1971 |
| GB | 2234570 A | 2/1991 |
| JP | 2006349047 A | 12/2006 |
| WO | 2000047387 A1 | 8/2000 |
| WO | 2004024411 A1 | 3/2004 |
| WO | 2009109776 A2 | 9/2009 |
| WO | 2020058769 A | 3/2020 |

* cited by examiner

MOLDING SYSTEM FOR INSULATED PIPE

CROSS-REFERENCE TO RELATED APPLICATION

This application claims priority to U.S. Provisional Patent Application Ser. No. 63/121,596, filed Dec. 4, 2020, which is hereby incorporated by reference in its entirety.

FIELD

The present disclosure generally relates to a molding system for applying moldable material to a pipe.

BACKGROUND

Metal pipes are often insulated to withstand harsh operating conditions. Pipes can be insulated in an injection molding process prior to deployment. Injection molded insulated pipes can be used, for example, in subsea oil and gas pipelines or risers. Some subsea oil and gas environments require pipes that can withstand temperatures of 350° F. or more.

An exemplary molding system for applying insulation to a pipe is disclosed in U.S. Patent Application Publication No. 2017/0355114, which is hereby incorporated by reference in it is entirety. In general, the disclosed molding system comprises an elongate mold defining a mold cavity. The mold is configured to receive a long pipe (e.g., pipe in excess of 35 feet in length, e.g., 40 feet or greater or 80 feet or greater) therein such that the mold cavity includes an annular space along the length of the pipe. The mold is configured to receive curable polymer into the annular space around the pipe so that the curable polymer fills the space. The curable polymer cures to form insulation along the pipe.

SUMMARY

In another aspect, a system for forming an insulated pipe comprises a first pipe insulation mold having a first mold cavity and a first inner diameter. The first pipe insulation mold is configured to support a pipe such the pipe extends along the first mold cavity and the first mold cavity includes a first annulus that extends circumferentially around the pipe. A second pipe insulation mold has a second mold cavity and a second inner diameter. The second pipe insulation mold is configured to support the pipe such the pipe extends along the second mold cavity and the second mold cavity includes a second annulus that extends circumferentially around the pipe. The second inner diameter is greater than the first inner diameter. One or more injectors are configured to inject a first polymer into the first mold cavity for forming a first layer of insulation on the pipe in the first annulus. Said one or more injectors are further configured to inject a second polymer into the second mold cavity for forming a second layer of insulation on the first layer of insulation.

In another aspect, a method of forming an insulated pipe comprises forming a first layer of insulation on the pipe from a first polymer and forming a second layer of insulation on the pipe over the first layer of insulation from a second polymer.

In another aspect, a method of forming field joint insulation along a field joint region at which first and second insulated pipes that are joined end-to-end comprises forming a first layer of field joint insulation from a first polymer along the field joint region between opposing ends of first pipe insulation layers of the first and second insulated pipes and forming a second layer of field joint insulation from a second material along the first layer of field joint insulation between opposing ends of second pipe insulation polymer of the first and second insulated pipes.

In another aspect, a subsea oil or gas pipeline or riser comprises first and second insulated pipes. Each of the first and second insulated pipes comprises a pipe having a length and an exterior extending along the length. A first layer of insulation is formed on the exterior of the pipe along the length of the pipe. The first layer of insulation is formed from a first material having a first rated maximum temperature. A second layer of insulation is formed on the first layer of insulation. The second layer of insulation is formed from a second material having a second rated maximum temperature. The first rated maximum temperature is greater than the second rated maximum temperature. Said first and second insulated pipes are joined together end-to-end and have a field joint region. The pipeline or riser further comprises field joint insulation along the field joint region. The field joint insulation comprises a first layer of field joint insulation from the first polymer along the field joint region between opposing ends of the first pipe insulation layers of the first and second insulated pipes and a second layer of field joint insulation from the second material along the first layer of field joint insulation between opposing ends of second pipe insulation layers of the first and second insulated pipes.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

There is a recognized need to increase the maximum operating temperatures of insulated pipes used in subsea oil and gas pipelines or risers. To that end, industry has developed certain advanced high-temperature polymers that can be used in molding systems of the type disclosed in U.S. Patent U.S. Patent Application Publication No. 2017/0355114 to increase the maximum operating temperature. However, the inventors have recognized that the available high-temperature polymers can have drawbacks for certain subsea applications. For example, known high temperature polymers can be expensive. Additionally, such materials can be somewhat inflexible, particularly when applied at significant thickness on the exterior of a pipe. The lack of flexibility is particularly problematic for insulated pipes used in the offshore oil and gas industry. These pipes often must be "reeled," which is the process by which pipes are wound around very large, ship-bound spools in a way similar to winding thread onto a sewing spool. Inflexible insulation tends to break and delaminate (broadly, fail) during the reeling process. The stress experienced by the insulation layer on the reel is the result of the bending of the pipe around the reel. For a given section of insulated pipe, the insulation nearer to the rotation axis of the reel is compressed and the insulation farthest away from the rotation is put into tension. The amount of stress is also a function of the thickness of the insulation. Therefore, by keeping a less flexible insulation thinner, it is less likely that stress will give rise to cracks which propagate and cause failure of the material.

One known advanced polymer with excellent thermal characteristics, but which is costly and may lack flexibility for reeling when applied at a large thickness, is the HT-200R material sold by FAS. Other examples of materials which have high temperature ratings but also high cost and/or low flexibility include silicone resin systems, certain molded epoxy or epoxy/PU resins (e.g., those available from Rosehill Polymers Group and LOGSTOR A/S), and certain high temperature resins available from Materia, Inc. under the brand name, Proxima® thermoset resins.

As explained more fully below, this disclosure provides a molding system that can apply an advance high temperature polymer (or other desired material) onto the exterior of a pipe at a small wall thickness so as to enhance flexibility and reduce cost. More particularly, this disclosure pertains to a molding system for applying two or more layers of insulation to a pipe in which a high temperature polymer is applied in a relatively thin layer on the surface of the pipe and one or more additional layers of insulation are formed over the first layer from another polymer material.

Figure 1:
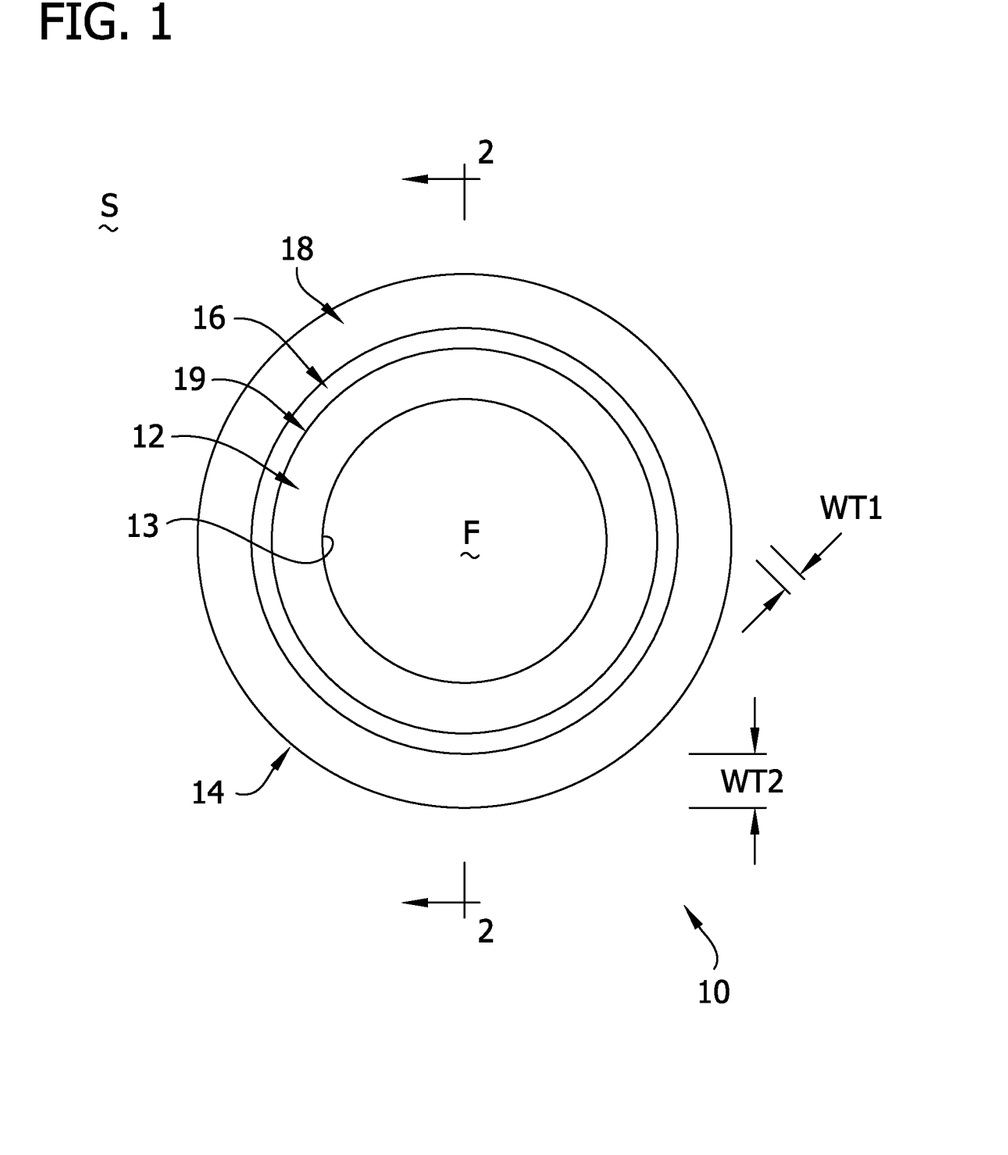
FIG. 1 is a cross-section of an insulated pipe in accordance with the present disclosure.

Referring to FIG. 1, an exemplary insulated pipe in accordance with the present disclosure is shown in cross-section and generally indicated at reference number 10. In certain embodiments, the insulated pipe 10 is configured for use in subsea oil or gas pipeline or riser. The insulated pipe 10 broadly comprises an inner steel pipe 12 and insulation 14 formed on the exterior of the inner pipe. In a subsea oil or gas pipeline application, the highest temperatures along the radial cross section of the insulated pipe 10 are found at the interface between the fluid stream F and the inner pipe 12, in other words, at the inner surface of the steel pipe, which defines a fluid lumen 13. The insulated pipe 10 is surrounded by seawater S at a significantly lower temperature than fluid F within the fluid lumen of the inner pipe 12. Heat flows radially outward from the fluid lumen 13 through the cross-section of the insulated pipe 10 into the surrounding seawater S at a steady state condition. Based on known characteristics of the insulation materials formed on the pipe 12, the radial temperature gradient (i.e., temperatures at radially spaced apart locations along the cross section of the insulated pipe 10) can be determined for any internal fluid lumen temperature.

The illustrated insulated pipe 10 is designed to withstand very high temperatures inside the fluid lumen while still allowing the pipe to be used on an offshore reel. This is achieved by forming a thin first insulation layer 16 from a high temperature polymer and forming a thicker second insulation layer 18 from a lower temperature polymer. Examples of polymers which may be suitable for the thicker second insulation layer 18 include the Hyperlast™ resin system available from The Dow Chemical Company, Flexilon materials available from Rosehill Polymers Group, or more broadly, castable PU or PU hybrid material. In one or more embodiments, the high temperature polymer of the first insulation layer 16 has a rated maximum temperature that is greater than the expected maximum temperature inside the fluid lumen for the application in question. In certain embodiments, the lower temperature polymer of the second insulation layer 18 has a rated maximum temperature that is less than the expected maximum temperature inside the fluid lumen. Thus, the rated maximum temperature of the high temperature polymer is greater than the rated maximum temperature of the lower temperature polymer. In certain embodiments, the high temperature polymer can have a rated maximum temperature of greater than 175° C. and the low temperature polymer can have a rated maximum temperature of at least about 150° C. In some embodiments, the maximum rated temperature of the low temperature polymer is less than but no more that 20% less than, no more than 15% less than, no more than 10% less than, no more than 3% less than, no more than 2% less than or no more than 1% less than the maximum rated temperature of the high temperature polymer. In one or more embodiments, the lower temperature polymer is more flexible than the high temperature polymer. For example, in certain embodiments, the lower temperature polymer has at least a 50% elongation at break. This allows the lower temperature polymer to be formed on the pipe 12 at a greater thickness than the high temperature polymer, while still allowing the insulated pipe to be used on an offshore reeling apparatus.

To ensure that the lower temperature polymer forming the second insulation layer 18 is not heated to a temperature in excess of its rated maximum temperature, the first insulation layer 16 is formed to have a wall thickness WT1 at which heat will dissipate radially along the first pipe insulation layer so that the temperature at the interface 17 between first pipe insulation layer and second pipe insulation is less than or equal to the rated maximum temperature of the lower temperature polymer forming the second pipe insulation layer. The intent is to make the thickness WT1 of the first pipe insulation layer no greater than required to keep the interface temperature between first pipe insulation layer 16 and second pipe insulation layer 18 below the second pipe insulation layer maximum operating temperature. By doing this, the amount of strain during reeling operations on the first pipe insulation layer 16 is kept to a minimum, which reduces the risk of failure due to the bending and elongation attendant to the reeling process. Because the lower temperature polymer is more flexible than the high temperature polymer, the second insulation layer can have a greater wall thickness WT2, suitably a wall thickness at which the second insulation layer 18 will dissipate heat so that the temperature at the exterior of the insulated pipe 10 is less than a predetermined temperature selected based on the application needs. In some embodiments, the second insulation layer 18 has a wall thickness WT2 that is at least 1% greater than, at least 2% greater than at least 3% greater than, at least 5% greater than, at least 10% greater than, at least 15% greater than or at least 20% greater than the wall thickness WT1 of the first insulation layer 16.

An exemplary method of forming the insulated pipe 10 will now be briefly described. First, a steel pipe 12 coated with an anticorrosion layer 19, commonly a suitable FBE (fusion bonded epoxy). The FBE coating 19 is abraded to improve adhesion between the FBE and the first insulation layer 16. The pipe is then placed in a first mold, so that the pipe is supported by the first mold such that the pipe extends along a first mold cavity to define a first annulus between the pipe and the mold that extends circumferentially around the pipe. An exemplary molding system for forming the first and second layers of insulation 16, 18 on the pipe 12 is described in U.S. patent application Ser. No. 17/505,191, filed Oct. 19, 2021, which is hereby incorporated by reference in its entirety. Liquid high temperature polymer is then pumped (e.g., using one or more injectors) into the mold and cured, e.g., in a reaction injection molding process. Once cured, the pipe 12, 16, now "partially insulated" with one layer of insulation 16, is removed from the mold. The flashing is trimmed, and mold release is cleaned from the exterior of the first pipe insulation layer 16. A technician may also abrade the surface of the first insulation layer 16 to improve adhesion to a subsequently applied layer 18. Abrasion may be carried out by hand, using an automated pressure abrasive blast, by an automated belt sanding system, and/or by an abrasive blast by a blast wheel. The partially insulated pipe 12, 16 is then placed into a second, larger mold (e.g., a mold of the general type disclosed in U.S. patent application Ser. No. 17/505,191). The second mold supports the pipe such that the pipe extends along a second mold cavity so that a second annulus is defined between the pipe (and more specifically the first insulation layer 16 on the pipe) and the wall of the second mold. The second annulus extends around the pipe. The second pipe insulation layer material is next pumped (e.g., using one or more injectors) into the mold and cured. Once cured, the insulated pipe 10 is removed, and flashing is trimmed.

Figure 3:
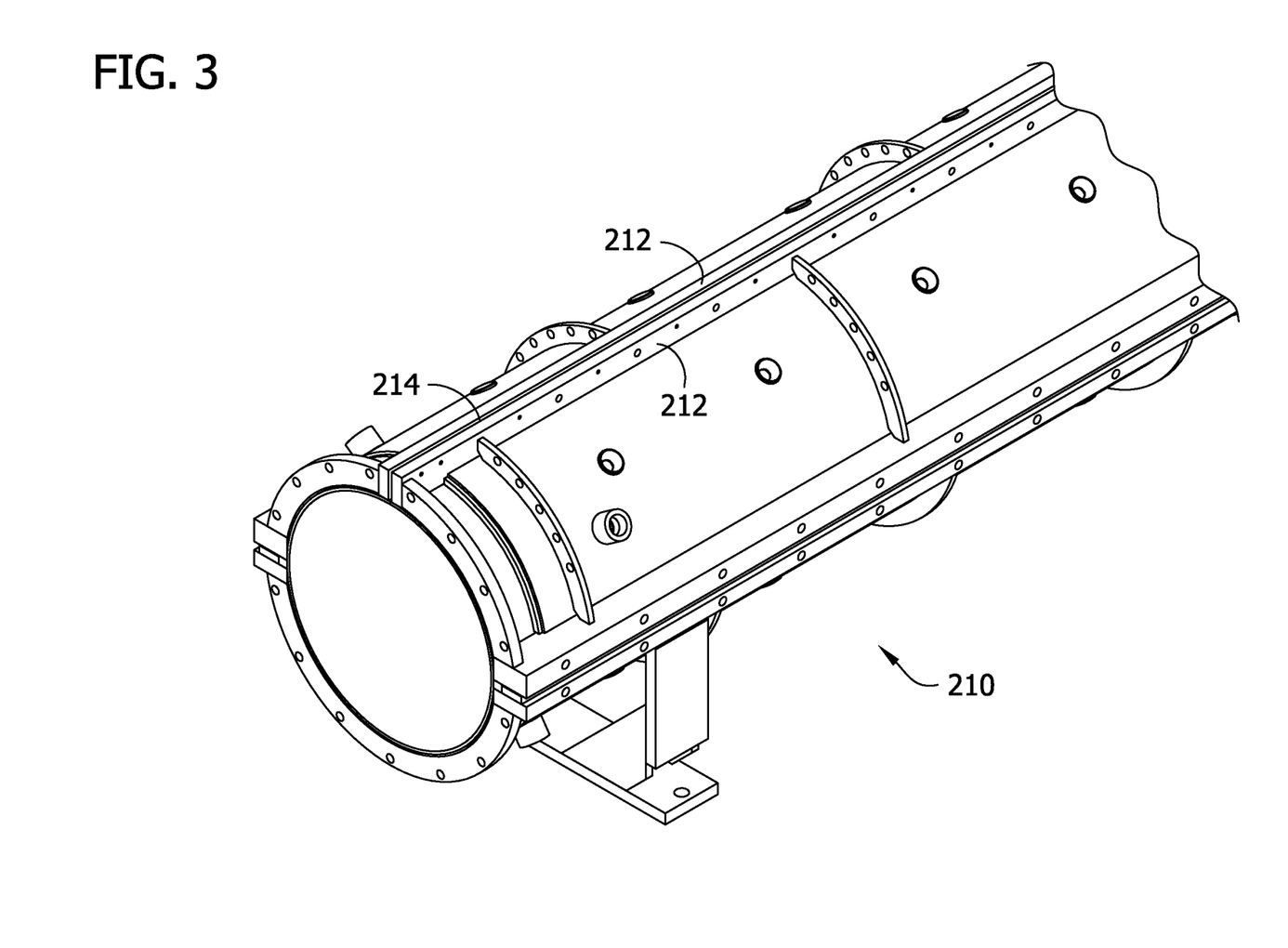
FIG. 3 is a fragmentary perspective of an end section of a mold for forming a second layer of insulation of the insulated pipe of FIG. 1.
Figure 4:
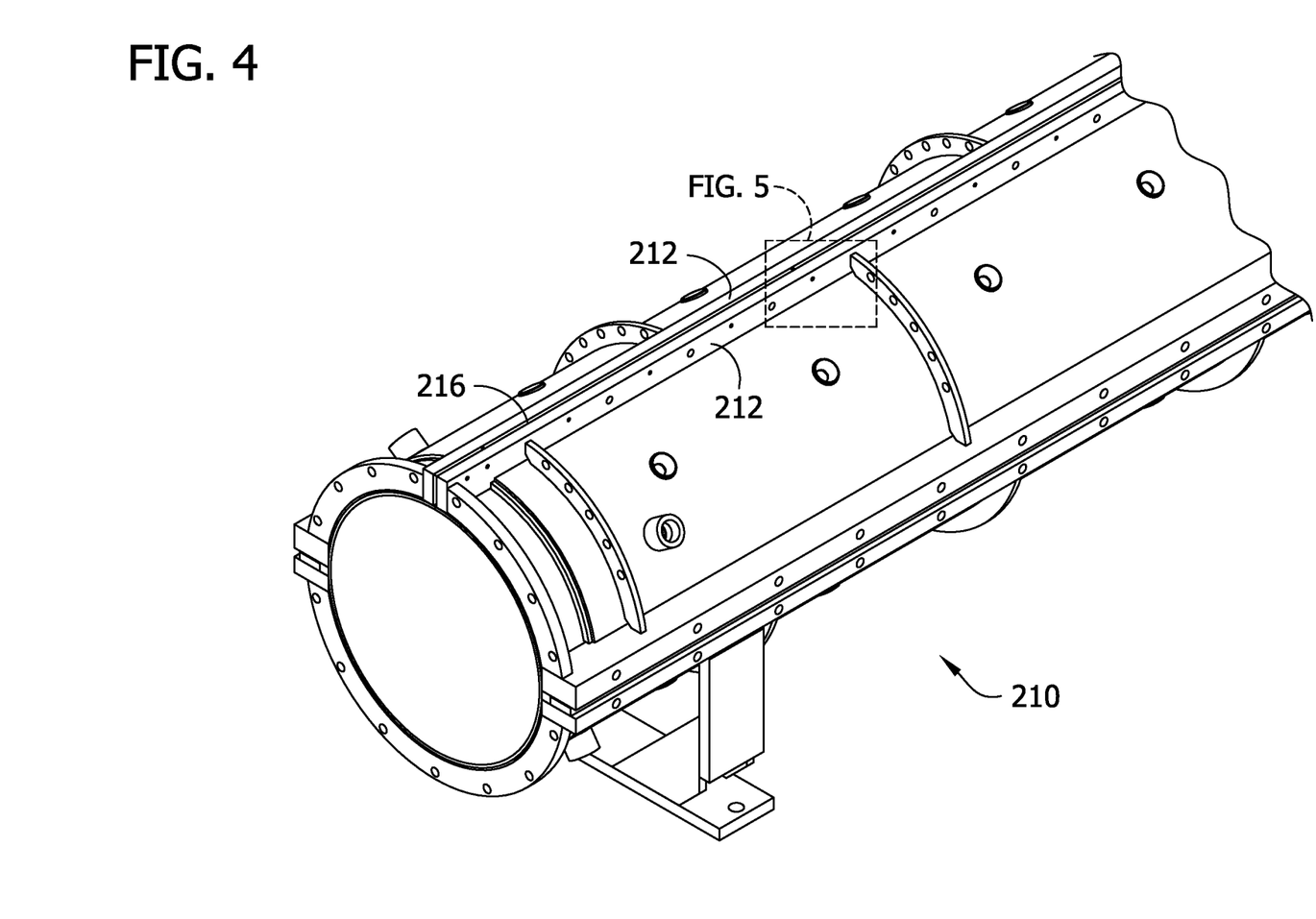
FIG. 4 is a fragmentary perspective similar to FIG. 3 but showing the mold in a configuration for forming a first layer of insulation of the insulated pipe of FIG. 1.
Figure 5:
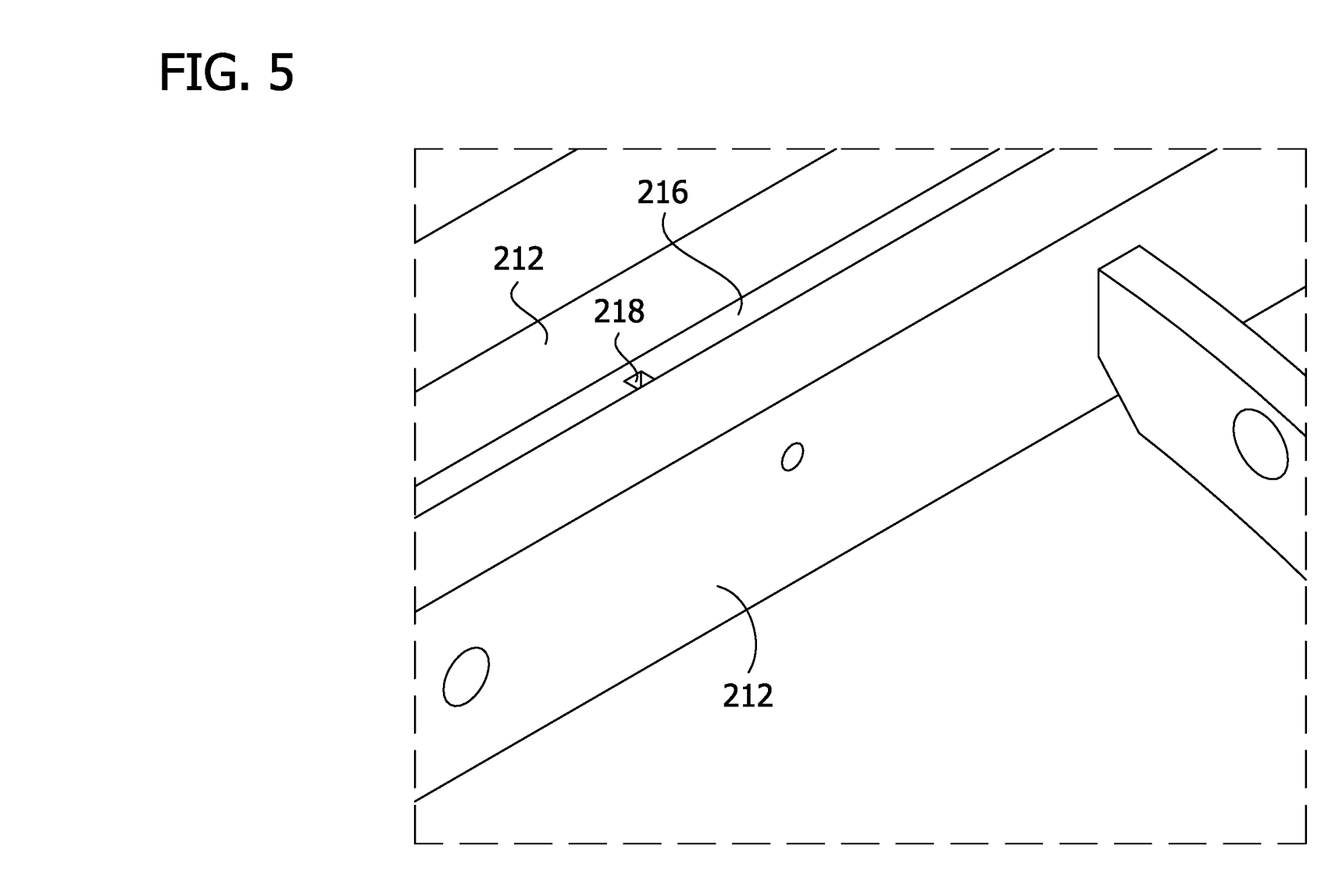
FIG. 5 is an enlarged view of a portion of FIG. 4.

For purposes of forming a very thin first layer of insulation 16, the molding system described in U.S. Patent Application Publication No. 2017/0355114 may be modified. The molding system in U.S. Patent Application Publication No. 2017/0355114 may not always be suitable for forming very thin layers of insulation like the first layer of pipe insulation 16 described above. A mold annulus of small radial dimension can create pressure head challenges when filling the mold. Referring to FIG. 3, a portion of a mold similar to the mold disclosed in U.S. Patent Application Publication No. 2017/0355114 is generally indicated at reference number 210. As explained in U.S. Patent Application Publication No. 2017/0355114, the mold 210 is configured to define an annular mold cavity about a pipe received in the mold. The upper end of the mold 210 comprises two vertically projecting flanges 212 spaced apart from one another to define an elongate upper slot 214 for forming flashing. The upper (or "flashing") slot 214 has an open top end along substantially the entire length of the mold for venting air and receiving flashing along the entire length of the mold. The mold 210 in the configuration shown in FIG. 3 may be used to form the second (thicker) layer of insulation 18 in one or more embodiments. Referring to FIGS. 4 and 5, in one more embodiments, the mold 210 is reconfigured or modified to include a seal or vent insert 216 in an upper section of the upper slot when molding the first (thinner) layer of insulation 16. Suitably, the vent insert 216 is sealingly received between the flanges 212 and comprises a plurality of pressure relief vent openings 218 at spaced apart locations along the length of the mold. The relief vent openings 218 allow entrapped air to escape, and the vent insert 216 still permits the lower density flashing material to accumulate in the lower section of the slot 214. A secondary clamping mechanism (not shown) can be provided along the flanges 212 to compress the vent insert 216 between the two flanges. The second mold for forming the second layer of insulation 18 over the first layer of insulation 16 may have a different end cap design than the first mold so that the second mold end caps can clamp onto the imperfect molded surface of the first insulation layer 16 without squeezing the material to the point of initiating a tear or crack. It will be understood that the mold 210 as configured in FIG. 3 is a "second mold" and the mold 210 as configured in FIGS. 4 and 5 is a "first mold."

In one or more embodiments, each insulated pipe 10 is formed in such a way as to allow for high integrity insulation to be formed at the field joints that connect insulated pipes end-to-end to form a pipeline or riser. Suitably, each of the two molds described above has a length that is less than the total length of the steel pipe 12. Furthermore, the length of the first mold (used to form the first pipe insulation layer 16) is greater than the length of the second mold (used to form the second pipe insulation layer 18). The steel pipe 12 is positioned in the first mold so that opposite end portions of the steel pipe protrude from the first mold during the first molding process. Likewise, the partially insulated steel pipe is positioned in the second mold so that opposite end portions of the first pipe insulation layer 16 protrude from the second mold during the second molding process.

Figure 2:
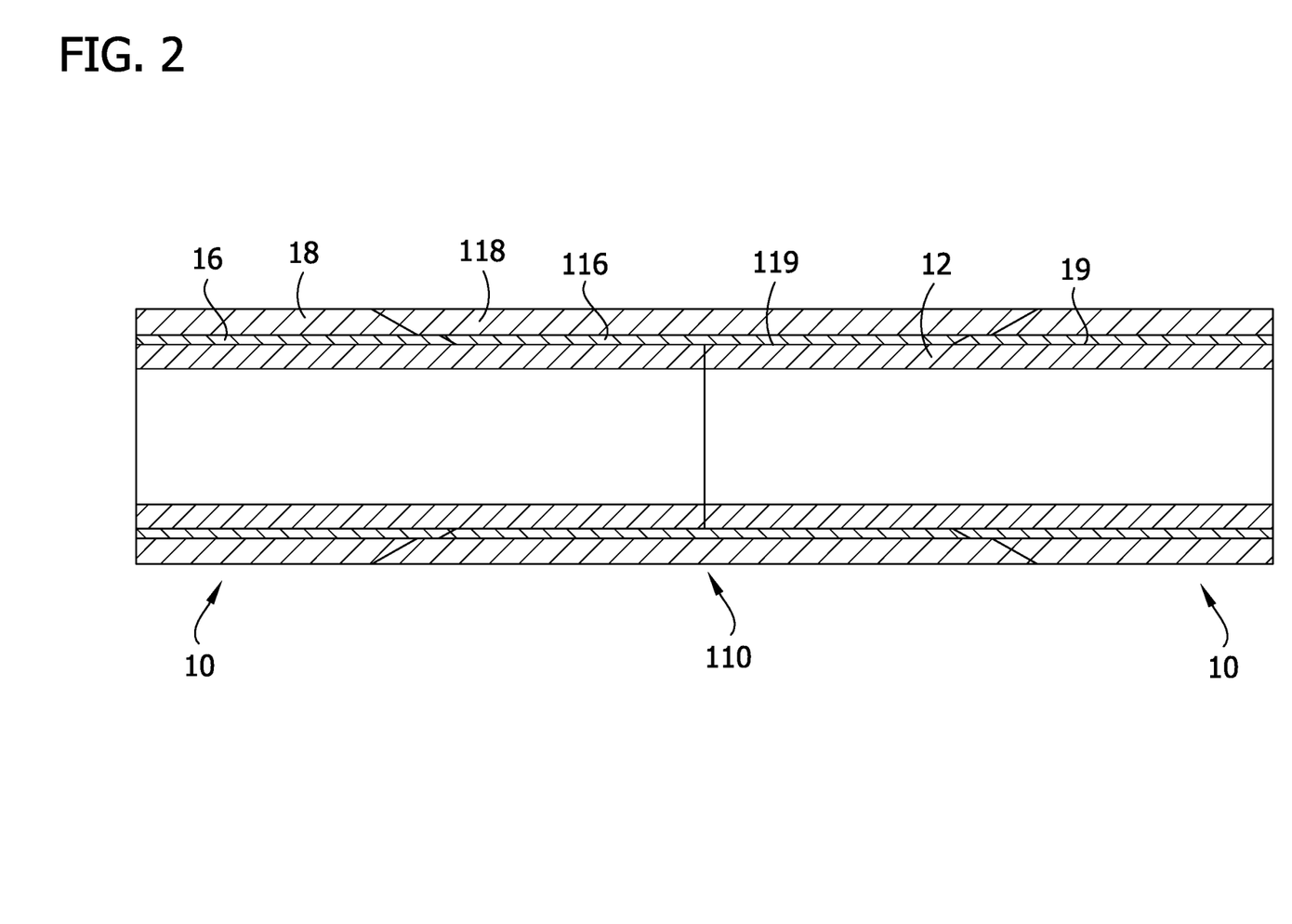
FIG. 2 is a longitudinal section through a field joint between two insulated pipes as shown in FIG. 1.

FIG. 2 shows an insulated field joint 110 of two of the insulated pipes 10 depicted in FIG. 1. Like the insulated pipes 10 themselves, the field joint 110 comprises an FBE coating 119 (broadly, an anti-corrosion coating) on the exterior of the pipe end portions, a first field joint insulation layer 116 on the FBE coating, and second field joint insulation layer 118 on the first field joint insulation layer. To ensure the insulation at the field joint 110 has good integrity with the factory-applied pipe insulation 16, 18, the first field joint insulation layer 116 is suitably the same type of material as the first pipe insulation layer 16 and the second field joint insulation layer 118 is suitably the same type of material as the second pipe insulation layer 18.

As explained above, the end portion of the first pipe insulation layer 16 protrudes from the second pipe insulation layer 18. Suitably, the protruding end portion of the first pipe insulation layer 16 is of sufficient length to enable a field joint mold (not shown) to be seated upon it so that the first layer of field joint insulation 116 can be formed on the exposed end portions of the steel pipe without intermingling with the second pipe insulation layer 18. In other words, the protruding length of the first pipe insulation end portion 16 is of sufficient length to seal with an end of a field joint mold used to form the first field joint insulation layer 116.

The process of forming the insulated field joint 110 is similar to the pipe molding process. The bare metal welded joint is coated with a compatible anticorrosion coating 119. The anticorrosion coating is abraded. A first field joint mold is sealingly secured onto the protruding end portions of the first pipe insulation layers 16 to define an annular mold cavity extending axially between the chamfered ends of the two first pipe insulation layers. The first field joint mold suitably comprises an inner diameter that is about the same as the outer diameter of the first pipe insulation layers 16. A technician imparts high temperature polymer into the first field joint mold and cures it. Once cured, the mold is removed, and flashing is trimmed. The first field joint insulation layer surface is cleaned and abraded.

A second field joint mold is then sealingly secured onto the end portions of the second pipe insulation layers 18 to define an annular mold cavity extending axially between the chamfered ends of the two second pipe insulation layers. The second field joint mold suitably comprises an inner diameter that is about the same as the outer diameter of the second pipe insulation layers 18. A technician imparts lower temperature polymer into the second field joint mold and cures it. Once cured, the second field joint mold is removed, and flashing is trimmed.

When introducing elements of the present disclosure or the preferred embodiment(s) thereof, the articles "a", "an", "the" and "said" are intended to mean that there are one or more of the elements. The terms "comprising", "including"

and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

The invention claimed is:

1. An insulated pipe comprising:
a pipe having a length and an exterior extending along the length;
a first layer of insulation formed on the exterior of the pipe along the length of the pipe, the first layer of insulation being formed from a first material having a first rated maximum temperature;
a second layer of insulation formed on the first layer of insulation, the second layer of insulation being formed from a second material having a second rated maximum temperature, the first rated maximum temperature being greater than the second rated maximum temperature,
wherein the second layer of insulation is more flexible than the first layer of insulation.

2. The insulated pipe as set forth in claim 1, wherein the first layer of insulation has a first end and an opposite second end on the pipe, and a first length along the length of the pipe from the first end of the first layer to the second end of the first layer, and the second layer of insulation has a first end and an opposite second end, and a second length along the length of the pipe from the first end of the second layer to the second end of the second layer, the first length being greater than the second length.

3. The insulated pipe as set forth in claim 2, wherein the first layer of insulation comprises opposite first and second end portions and each of the opposite first and second end portion protrudes from the second layer.

4. The insulated pipe as set forth in claim 3, wherein each of the first and second end portions of the first layer of insulation is configured for sealing engagement with an end portion of a field joint mold.

5. The insulated pipe as set forth in claim 1, wherein the first layer of insulation has a first radial wall thickness and the second layer of insulation has a second radial wall thickness greater than the first radial wall thickness.

6. The insulated pipe as set forth in claim 5, wherein the insulated pipe is configured for conveying fluid up to a predefined maximum fluid temperature, wherein the first radial wall thickness is about equal to a radial wall thickness at which the first material dissipates heat from fluid inside the insulated pipe at the predefined maximum fluid temperature so that a temperature at an outer surface of the first layer is about equal to the second rated maximum temperature.

7. The insulated pipe as set forth in claim 1, wherein the first layer of insulation is made of a first polymer molded onto the pipe and the second layer of insulation is made of a second polymer molded onto the pipe.

8. The insulated pipe of claim 1 wherein the first rated maximum temperature of the first layer of insulation is greater than a maximum temperature of the fluid to be carried in the pipe and the second rated maximum temperature of the second layer of insulation is less than the maximum temperature of the fluid to be carried in the pipe.

9. The insulated pipe of claim 1 wherein the first layer of insulation has an elongation at breaking of at least 50%.

10. The insulated pipe of claim 1 wherein the pipe with the first layer of insulation and the second layer of insulation is wound onto a reel.

11. The insulated pipe of claim 1 wherein the first layer of insulation is self-supporting on the pipe.

* * * * *